United States Patent
Kanatsu (10) Patent No.: US 7,738,702 B2
(45) Date of Patent: Jun. 15, 2010

(54) IMAGE PROCESSING APPARATUS AND IMAGE PROCESSING METHOD CAPABLE OF EXECUTING HIGH-PERFORMANCE PROCESSING WITHOUT TRANSMITTING A LARGE AMOUNT OF IMAGE DATA TO OUTSIDE OF THE IMAGE PROCESSING APPARATUS DURING THE PROCESSING

(75) Inventor: Tomotoshi Kanatsu, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/300,143

(22) Filed: Dec. 14, 2005

(65) Prior Publication Data

US 2006/0133671 A1  Jun. 22, 2006

(30) Foreign Application Priority Data

Dec. 17, 2004 (JP) ............................. 2004-366014

(51) Int. Cl.
*G06K 9/34* (2006.01)
(52) U.S. Cl. ...................................................... 382/173
(58) Field of Classification Search ....................... None
See application file for complete search history.

(56) References Cited

U.S. PATENT DOCUMENTS

| | | | | |
|---|---|---|---|---|
| 5,265,174 A | * | 11/1993 | Nakatsuka | ................... 382/189 |
| 5,680,478 A | | 10/1997 | Wang et al. | |
| 5,809,167 A | * | 9/1998 | Al-Hussein | .................. 382/190 |
| 5,982,928 A | * | 11/1999 | Shimada et al. | ............. 382/187 |
| 6,055,333 A | * | 4/2000 | Guzik et al. | ................. 382/187 |
| 6,343,148 B2 | * | 1/2002 | Nagy | .......................... 382/187 |
| 6,917,438 B1 | * | 7/2005 | Yoda et al. | .................. 358/1.15 |
| 2003/0164819 A1 | * | 9/2003 | Waibel | ........................ 345/173 |

FOREIGN PATENT DOCUMENTS

| JP | 61206090 A | * | 9/1986 |
|---|---|---|---|
| JP | 2002-269253 A | | 9/2002 |
| JP | 2003-084929 A | | 3/2003 |

OTHER PUBLICATIONS

Abstract in English of JP 61206090 A.*

* cited by examiner

*Primary Examiner*—Yuzhen Ge
(74) *Attorney, Agent, or Firm*—Canon U.S.A., Inc. I.P. Division (57) ABSTRACT

When the content of a paper document is aiming to be recognized in an apparatus that has a scanner, an image of the paper document is subjected to region segmentation processing immediately after the paper document is read, and a recognition operation to be performed on each segmented region is specified by an operator on the basis of the result of the region segmentation processing. Therefore, a recognition method to be performed on each recognition target item can be selected from among recognition by using a recognition service server, recognition by downloading a program module from a program server, and recognition by using a locally-stored program module. As a result, recognition processing can be performed more efficiently.

16 Claims, 7 Drawing Sheets

| Address | 9-9-9, XXX, Minato-ku, TOKYO | | |
|---|---|---|---|
| Name | Taro Mita | TEL | 03-44XX-XX02 |
| Answers | (a) 2 (b) 4 (c) 7 (d) 5 | | |

XXXXXXXXXX

XXXXXXXXXX
XXXXXXXXXX
XXXXXXXXXX
XXXXXXXXXX

FIG. 6

Dear
Taro Mita

You are registered as follows:

Address
9-9-9, xxx, Minato-ku, Tokyo

Phone number(s)
03-44xx-xx02

OXOXOXOXOXOXOX
OXOXOXOXOXOXOX
OXOXOXOXOXOXOX
OXOXOXOXOXOXOX

IMAGE PROCESSING APPARATUS AND IMAGE PROCESSING METHOD CAPABLE OF EXECUTING HIGH-PERFORMANCE PROCESSING WITHOUT TRANSMITTING A LARGE AMOUNT OF IMAGE DATA TO OUTSIDE OF THE IMAGE PROCESSING APPARATUS DURING THE PROCESSING

BACKGROUND OF THE INVENTION

1. Field of the Invention

The present invention relates to recognition processing for image data.

2. Description of the Related Art

In recent years, it has become popular to summarize, manage, and store information in customer service businesses by using electronic data. However, for collecting the information from customers in these operations, paper is still widely used because of its high portability and universality.

To convert data presented on paper into electronic data, a scanner device for converting the content presented on paper into an image serving as electronic data and a recognition device of recognizing characters or the like in the image and of converting them into meaningful data are necessary.

Traditionally, scanners, which are used to convert an original document into images, are connected to computers as peripheral devices and operate only in accordance with programs in computers. These days, some apparatuses that have scanners include versatile central processing units (CPUs) and user interfaces so that the CPUs can execute programs, in addition to a program of controlling the apparatuses. In this case, it has become possible that the apparatuses perform various processing, in addition to scanning, by themselves.

Furthermore, with this feature, it has become possible that scanners execute character recognition programs and utilize the scanned image as meaningful data by themselves, in addition to converting the original documents into the scanned images.

For example, a multifunction peripheral (MFP), which is a device that combines several functions (e.g., scanning and printing) into one unit, can have an additional function of printing recognized addresses on cards or envelopes by incorporating into the MFP a process of recognizing characters from a document image and then converting them into character codes.

When an MFP to which a hard disk and a network function are added is used as a database storing read documents, recognizing the content of a document allows the MFP to extract a keyword relating to the content from the character strings and to exploit the keyword as an index for searching.

This case, however, has the following problems:

Problem 1: Since a CPU incorporated in an apparatus has only a low processing speed, the time required for performing character recognition processing is inevitably very long. Since a memory that can be used is limited, some processing cannot be executed, thus resulting in insufficient performance.

Problem 2: Since programs that can be stored in the apparatus are limited, processing is inevitably limited.

To address Problem 1, a method (hereinafter, referred to as Method A) of transmitting an image to an external computer connected to a network, making the external computer perform desired processing, receiving the result of the processing, and using the result is proposed in, for example, Japanese Patent Laid-Open No. 2002-269253.

To address Problem 2, a method (hereinafter, referred to as Method B) of storing programs in a server connected to a network, dynamically downloading a necessary program into an apparatus, and executing the program is discussed in, for example, Japanese Patent Laid-Open No. 2003-084929.

For Method A, however, there is a problem in which because a document image obtained by scanning is transmitted in its entirety the transmission of the image is burdensome to the bandwidth used in a network when the image has a large size. In particular, if a user attempts to process a color document with high resolution, an image with a large size (several megabytes (MBs) to a dozen or so MBs) is transmitted in the network because a compression ratio cannot be increased above a predetermined level in order to avoid image degradation in text.

For Method B, no transmission of an image is required, so that the bandwidth used in the network does not have burdens. However, an insufficient performance problem resulting from the limitations in the power of the CPU and the memory resources remains unsolved.

SUMMARY OF THE INVENTION

The present invention provides an image processing apparatus and an image processing method capable of executing high-performance processing without having to transmit a large amount of image data to the outside of the apparatus during the processing.

According to a first aspect of the present invention, an image processing apparatus includes an image input unit, a region segmentation unit, a selecting unit, and a determining unit. The image input unit is configured to input image data. The region segmentation unit is configured to extract a plurality of recognition target regions from the image data input by the image input unit. The selecting unit is configured to allow an operator to make a selection of a recognition process to be executed with respect to each of the plurality of recognition target regions extracted by the region segmentation unit. The determining unit is configured to, in response to the selection made in the selecting unit, determine whether each of the recognition target regions is to be transmitted to an external recognizing device and to be subjected to recognition processing in the external recognizing device.

According to a second aspect of the present invention, an image processing apparatus includes an image input unit, a region segmentation unit, a selecting unit, and a controlling unit. The image input unit is configured to input image data. The region segmentation unit is configured to extract a plurality of recognition target regions from the image data input by the image input unit. The selecting unit is configured to display the plurality of recognition target regions extracted by the region segmentation unit on a display in a recognizable manner and to allow an operator to make a selection of a recognition process to be executed with respect to each of the plurality of recognition target regions displayed. The controlling unit is configured to, in a case where the selection in the selecting unit is that a recognition target region is to be transmitted to an external recognizing device and to be subjected to the recognition processing in the external recognizing device, transmit the recognition target region to the external recognizing device and subject the recognition target region to the recognition processing in the external recognizing device. The controlling unit is configured to, in a case where the selection in the selecting unit is that a recognition program is to be downloaded from an external device and the recognition target region is to be subjected to the recognition processing, download the recognition program from the external device and subject the recognition target region to the recognition processing. The controlling unit is configured to, in a case where the selection in the selecting unit is that the recognition target region is to be subjected to the recognition processing by using a recognition program stored in advance, subject the recognition target region to the recognition processing by using the recognition program stored in advance.

According to at least one exemplary embodiment of the present invention, when the content of a paper document is aiming to be recognized in an apparatus that has a scanner, region segmentation processing is performed on an image of the paper document immediately after the paper document is read, and a recognition operation to be performed on each segmented region is specified by an operator on the basis of the result of the region segmentation processing. Therefore, a recognition method to be applied to each recognition target item can be selected from among recognition by using a recognition service server, recognition by downloading a program module from a program server, and recognition by using a locally-stored program module. As a result, recognition processing can be performed more effectively.

In addition, in a case where the external recognition service server is used, since a segmented region is transmitted, the load imposed on a network is small.

Furthermore, in a case where the program module is downloaded to perform recognition processing, a program suitable for each recognition target segment can be used.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

First Exemplary Embodiment

Figure 1:
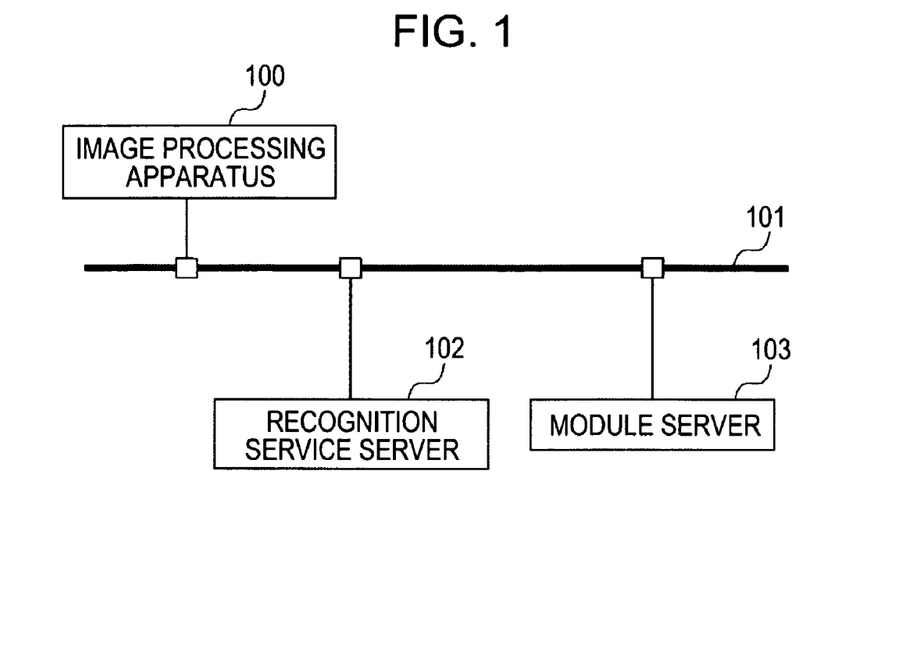
FIG. 1 illustrates a structure of an image processing system.

FIG. 1 shows an image processing system according to a first exemplary embodiment.

An image processing apparatus 100 is connected to a recognition service server 102 and a module server 103 over a network 101 (e.g., local area network (LAN) or the Internet). The recognition service server 102 functions to receive an image over the network 101, recognize the content of the image, and return data of the recognition result to a source that sent the image. A module server 103 stores program modules executable by the image processing apparatus 100 and, in response to a request from the image processing apparatus 100, transmits a program module that meets the request.

Figure 2:
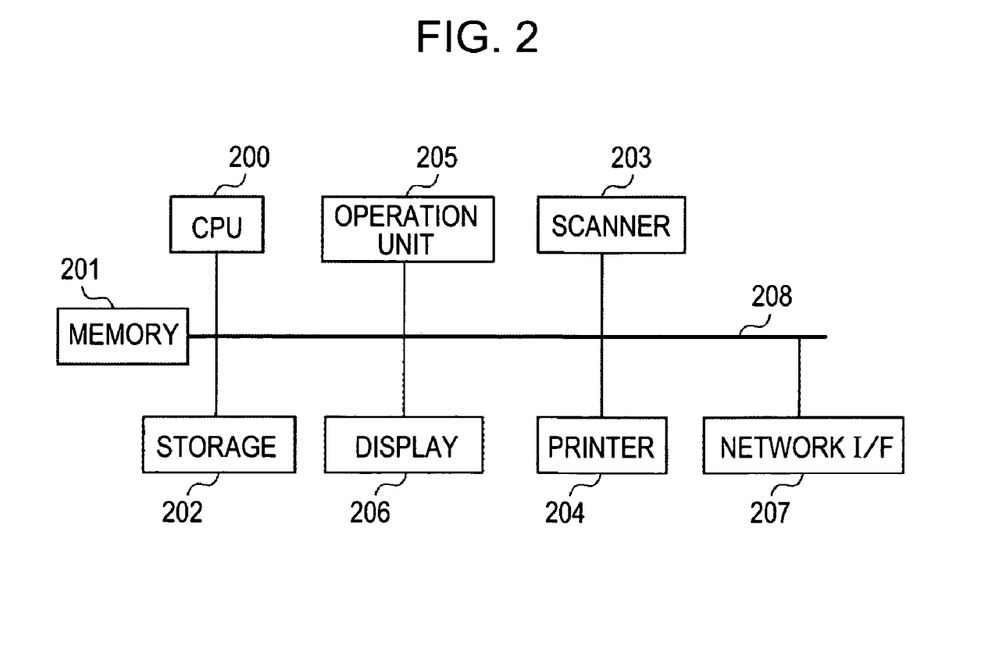
FIG. 2 illustrates a structure of an image processing apparatus.

FIG. 2 illustrates an exemplary hardware configuration of the image processing apparatus 100.

A central processing unit (CPU) 200 controls the operations of the image processing apparatus 100. A memory unit 201 is used for execution of a software program by the CPU 200 and temporarily stores data, such as an image and the like. A storage unit 202 permanently stores a program, data, an image, and the like, and is, for example, a hard disk. A scanning unit 203 reads an original paper document. A printing unit 204 records an image on paper. An operation unit 205 is used for receiving information that a user inputs with a key or a touch panel of a display unit 206. The display unit 206 shows information to the user. A network interface (I/F) 207 is connected to a network. These components are connected to each other with a bus 208.

Figure 3:
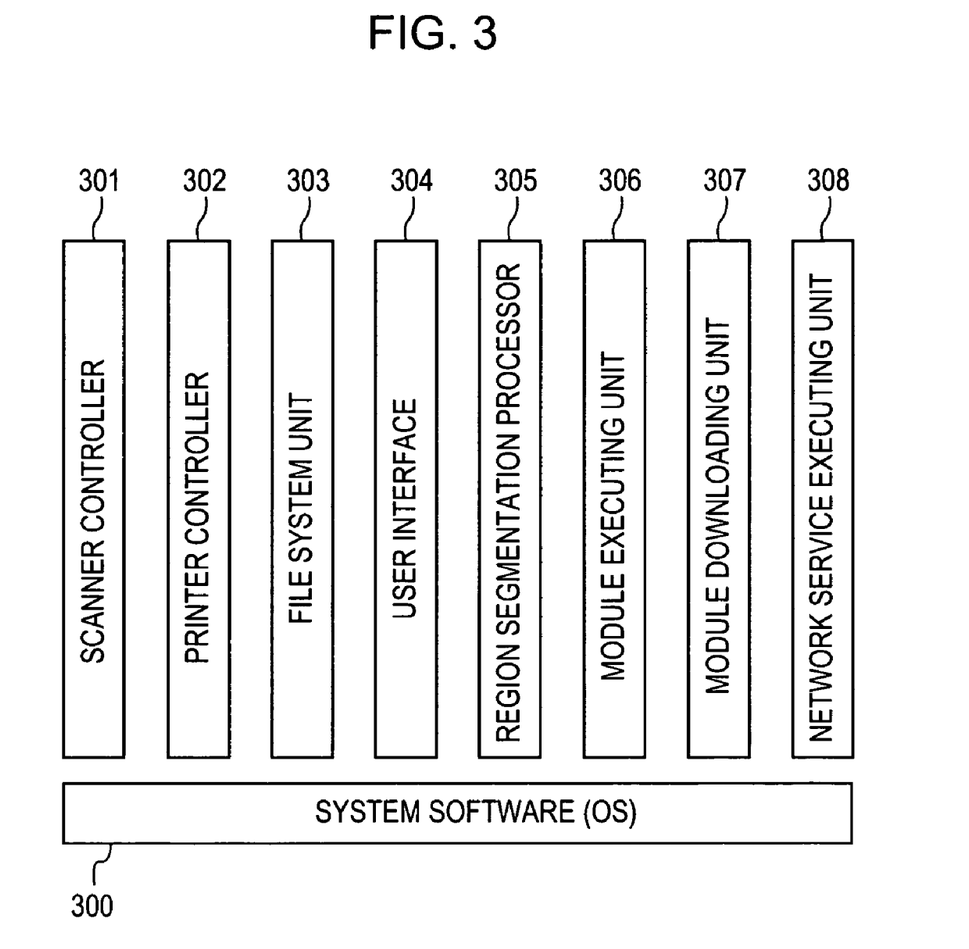
FIG. 3 illustrates an example of a software configuration of the image processing apparatus.

FIG. 3 illustrates a configuration of software (a computer program) executed in the image processing apparatus 100.

An operating system (OS) 300 is system software of the image processing apparatus 100. Software programs 301 to 308 operate under the control of this operating system.

The scanner controller 301 controls the scanning unit 203 to capture to the memory unit 201 document image data into which an original paper document is photoelectrically converted.

The printer controller 302 controls the printing unit 204 to form an image in the memory unit 201 on paper.

The file system unit 303 controls the storage unit 202 to provide reading data from files and writing data to files.

The user interface 304 controls input and output of information via the operation unit 205 and the display unit 206.

The region segmentation processor 305 performs control so as to analyze an image obtained by scanning and to extract regions corresponding to attributes, including a character, graphics, a photograph, a table, and a line. This region segmentation processing can use a known region segmentation method, for example, that disclosed in U.S. Pat. No. 5,680,478 titled "Method and Apparatus for Character Recognition" invented by Shin-Ywan Wang et al. and assigned to Canon Kabushiki Kaisha. In this method, a set of blocks each consisting of the contour of eight successive black pixels and a set of blocks each consisting of the contour of four successive white pixels are extracted from a document image, so that regions corresponding to attributes, including a character, an illustration, a diagram, a table, a frame, a line, and the like, which are characteristic of documents, are extracted on the basis of the shape, the size, and the state of the set.

The module executing unit 306 executes a processing program for executing, for example, recognition processing on an image in part or in entirety. This processing program includes code to expand the functions of the apparatus, specifically, code of various modules to obtain data by performing processing on image data obtained by scanning, not a program in a broad sense that includes all code performed by the CPU 200, i.e., code executed to basically control each unit of the apparatus.

As an example, the Java® technology can be used. In the Java technology, a virtual machine that operates as one process on an operating system executes a program module that is written as the code for this virtual machine.

The module downloading unit 307 performs control so as to download the code of the module from the module server 103.

The network service executing unit 308 transmits an image to the recognition service server 102 which performs recognition processing on the image and receives the recognition result from the recognition service server 102.

Next, the operation of the image processing apparatus 100 is described.

Figure 5:
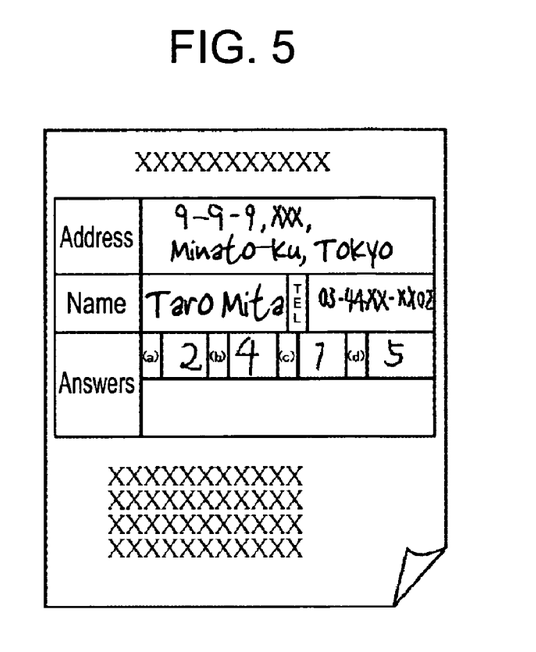
FIG. 5 illustrates an example of a registration form completed by a customer.
Figure 6:
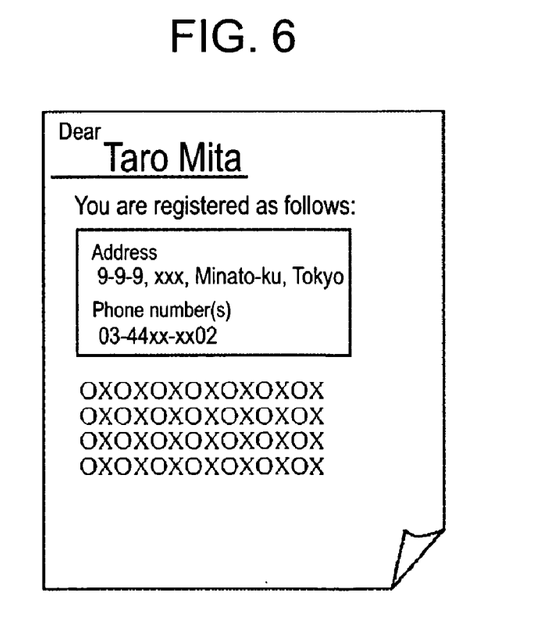
FIG. 6 illustrates an example of a reply form.

In this explanation, a case in which the content of a registration form entered by a customer is converted into electronic data is described as an example. The outline of the operation is as follows: (1) a registration form written by a customer, as shown in FIG. 5, is scanned, (2) the items (e.g., an address and a name) written by the customer are then subjected to recognition processing on an item-by-item basis, (3) data converted to character codes is obtained, (4) the obtained data and the scanned image are stored so as to be associated with each other, and (5) a reply form, as shown in FIG. 6, is printed out based on the obtained data.

Figure 4:
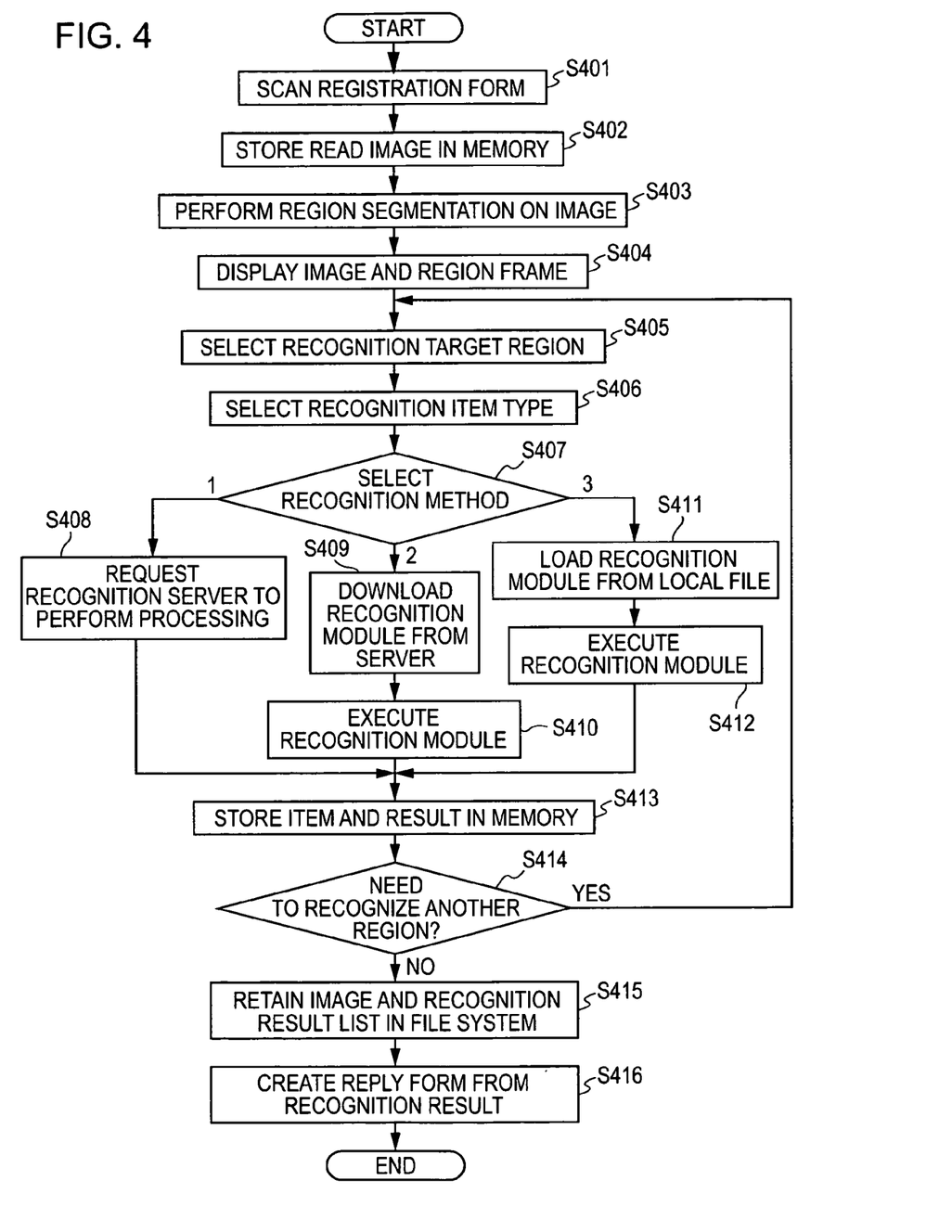
FIG. 4 is a flowchart of processing according to a first exemplary embodiment.

The details of the operation are described with reference to the flowchart of FIG. 4.

In step S401, when an operator places the registration form on the scanning unit 203 and provides an instruction to read the registration form through the display unit 206, the instruction is detected and the scanning unit 203 scans the registration form.

In step S402, a document image obtained by scanning by the scanning unit 203 is temporarily stored in the memory unit 201.

Figure 7:
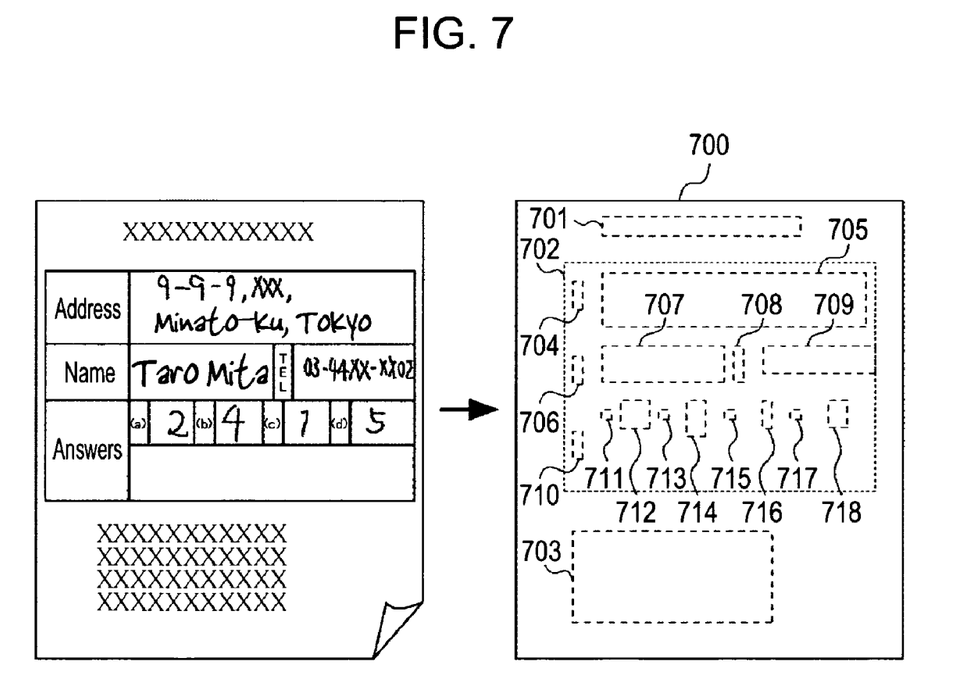
FIG. 7 illustrates an example of region segmentation result data.

In step S403, a program in the region segmentation processor 305 shown in FIG. 3 on an image for one page stored in the memory unit 201 is executed, thus dividing the image into a plurality of regions corresponding to attributes, including a character, graphics, a photograph, a table, a line, and the like. As a result of the region segmentation processing, the region segmentation result data is obtained. FIG. 7 illustrates how the region segmentation processing is performed and a data set 700 as an example of the region segmentation result data. In the data set 700, data segments 701 and 703 are character regions, and a data segment 702 is a table region. For cells in the table region 702, character regions 704 to 718 corresponding to the character strings in the cells are extracted. The region segmentation result data retains the rectangular coordinates of each region.

Figure 8:
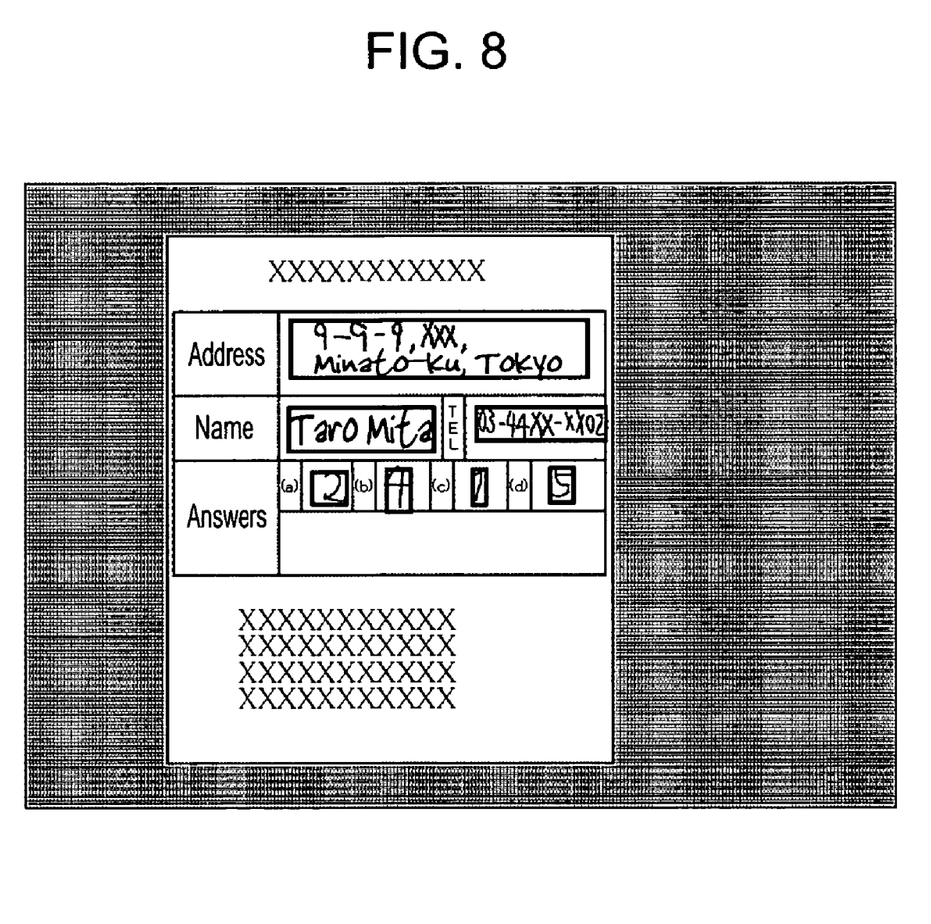
FIG. 8 illustrates an image and regions appearing on a display.

In step S404, the image is appropriately reduced, the region segmentation result is stacked on the reduced image in the form of a frame, and the resultant image is displayed on the display unit. In this case, in order to increase the efficiency of selecting operations performed by an operator by narrowing down recognition target regions, only a region of a large character, which seems to be a handwritten portion, may be displayed. FIG. 8 illustrates an example of a screen that appears on the display unit. Each region is surrounded by, for example, a red frame.

In step S405, the operator specifies a recognition target region by selecting a frame appearing on the display unit. The operator can specify the recognition target region by directly touching the frame on a touch panel or the like, or by selecting the target frame with an arrow key and then pressing an Enter key.

In step S406, the operator selects an item as which the region selected by the operator in step S405 is to be recognized. In this explanation, the operator can select it from among "address", "name", "phone number", "choice (numeral)", and "choice (alphabet)".

In step S407, the operator selects a recognition method (process) for recognizing the selected region from the following three choices: (1) recognition by using a recognition service server, (2) recognition by downloading a program module from a program module server, and (3) recognition by using a local program module.

In this step S407, according to the content of an item specified by the operator in step S406, a plurality of recognition methods available to recognize the content of the item by the apparatus are shown to the operator, so that the operator can select a desired recognition method from the plurality of recognition methods.

The actual relationship between a selected recognition method and its performance depends on individual cases. Examples of recognition methods that have relatively common characteristics are described below.

For recognition by using a recognition service server, since the recognition service server can have a higher-performance CPU and a larger memory than those in the image processing apparatus, recognition processing composed of complicated recognition logic can be provided. In particular, recognition processing that fully utilizes a resource of the server, including recognition processing for many character types that requires a large dictionary and recognition processing with post-processing correction by database matching, can be provided. This recognition method is advantageous in that the accuracy of recognition processing is high because complicated recognition logic can be performed and in that, if the server has high performance, the speed of recognition processing is high. However, this recognition method is disadvantageous in that since an image is transmitted over a network, if the size of the image is large or if many images are transmitted because many regions are processed, an increase in the processing time resulting from increased communication overhead may occur.

For recognition by downloading a program module, a recognition program specialized for recognizing a selected item can be downloaded, and recognition processing composed of relatively-complicated recognition logic can be provided. Since resources (CPU and memory) of the apparatus are used, the accuracy of recognition processing is slightly lower and the speed of recognition processing is lower than those in the recognition processing by using the recognition service server. Since the transmission of an image is not required, an increase in the processing time resulting from an increase in communication overhead does not occur. If downloading enormous volumes of dictionary data together with the program module is necessary, performance may be decreased correspondingly. One approach to this problem is, in a case where a plurality of items is processed, to download a program module once and use it successively without downloading a new one. This approach may make this downloading recognition method more efficient than the recognition method by using a recognition service server.

For recognition by using a general-purpose recognition program module locally stored, the time required for recognition processing is long because the CPU in the apparatus performs processing, but an increase in the processing time resulting from an increase in communication overhead does not occur because transmission and reception of data, including images, is not performed. However, a limited storage space within the apparatus is not suitable to store a plurality of programs specialized for respective recognition target items, and as a result, it stores a very versatile program and a simple recognition program. Therefore, the accuracy of recognition processing in this recognition method is lower than that in the recognition method by using a recognition service server and that in the recognition method by downloading a program module.

In this exemplary embodiment, when an "address" item (705) is to be recognized, the operator selects the recognition method in which a recognition service server dedicated to address recognition is used and recognition result correcting processing using an address database is included. When "name" (707) and "telephone number" (709) items are to be recognized, the operator selects the recognition method in which a character-recognition program module specialized for names and that for phone numbers are downloaded. When a "choice (numeral)" (712, 714, 716, 718) is to be recognized, the operator selects the recognition method in which a recognition program locally stored is used. In this exemplary embodiment, recognition processing for handwritten characters is described as an example. The recognition processing is not limited to this, however. Recognition processing for printed characters, that for imprints of seals, and that for marks (e.g., company emblem) are applicable.

Selecting a recognition method is not limited to the example in which the operator selects the recognition method from among the three choices in consideration of efficiency. For example, if a locally-stored program module that is appropriate for recognizing a selected item does not exist, the showing of choice (3) may be omitted. For example, the showing of a recognition method with significantly low accuracy or efficiency may be omitted. Alternatively, the recognition method may be semi-automatically selected by facilitating the operator's selection by, for example, comparing the amount of code of a program module with the size of an image and then recommending a smaller one.

Further, a system in which different usage fees are charged to the three choices may be added to this exemplary embodiment. In this case, the usage fees may be shown to the operator, or the usage fees may be used as a selection condition so that the choices can be narrowed down before being displayed. In this case, the number of uses of a downloaded program module may be limited.

Referring back to FIG. 4, if, in step S407, choice (1) is selected, processing then proceeds to step S408. In step S408, a selected recognition service server is requested to perform recognition processing, and at the same time, an image portion corresponding to a recognition target region separated from the entire image is transmitted to the recognition service server. When the recognition result is received from the recognition service server, processing proceeds to step S413.

If, in step S407, choice (2) is selected, processing then proceeds to step S409. In step S409, a program server is requested to allow a program module for recognizing the item selected in step S405 to be downloaded therefrom. In this case, if the program module to be used has been downloaded in the execution unit, such a request is not performed. After the program module is received, the program module is executed and the recognition result is obtained in step S410, and processing then proceeds to step S413.

If, in step S407, choice (3) is selected, processing then proceeds to step S411. In step S411, a program module stored in a local file or the like is loaded into the program-module execution unit. In step S412, the loaded program is executed and the recognition result is obtained, and processing then proceeds to step S413.

In step S413, the item and the obtained recognition result are stored in the memory in such a way that they are associated with each other.

In step S414, the operator selects recognition of another region or completion of the recognition processing. If another region is to be recognized (Yes in step S414), processing then goes back to step S405; if the recognition processing is to be completed (No in step S414), processing then proceeds to step S415.

In step S415, a list of data in which each item is associated with a corresponding recognition result and the image obtained by scanning are retained in the file system unit.

In step S416, a reply form is created by reading the recognition result corresponding to a necessary item from the list of data. For example, with respect to a predetermined item of the format of the reply form, characters in the form of a font based on a character code string in a corresponding recognition result are printed on paper. An example of the created reply form to which characters are output is shown in FIG. 6.

As described above, when the operator is aiming to make the content of a paper document be recognized in the apparatus, an image of the paper document is subjected to region segmentation processing immediately after the document is read, and the operator selects a recognition operation for each segmented region by using the result of the region segmentation processing.

When a recognition method by using a recognition service server is selected, an image portion corresponding to the segmented region is transmitted. This avoids a large load from being imposed on a network.

When a recognition method by downloading a program module from a program server is selected, the program suitable for a recognition target item can be selected and used. This realizes optimal performance for every item.

Since the recognition method to be performed on each recognition target item can be selected from among recognition by using a recognition service server, recognition by downloading a program module from a program server, and recognition by using a locally-stored program module, performance can be finely optimized. Furthermore, the operator can select the recognition method in consideration of the fee charged to the recognition method, and therefore, the recognition processing corresponding to the user's estimate cost can be performed.

Figure 9:
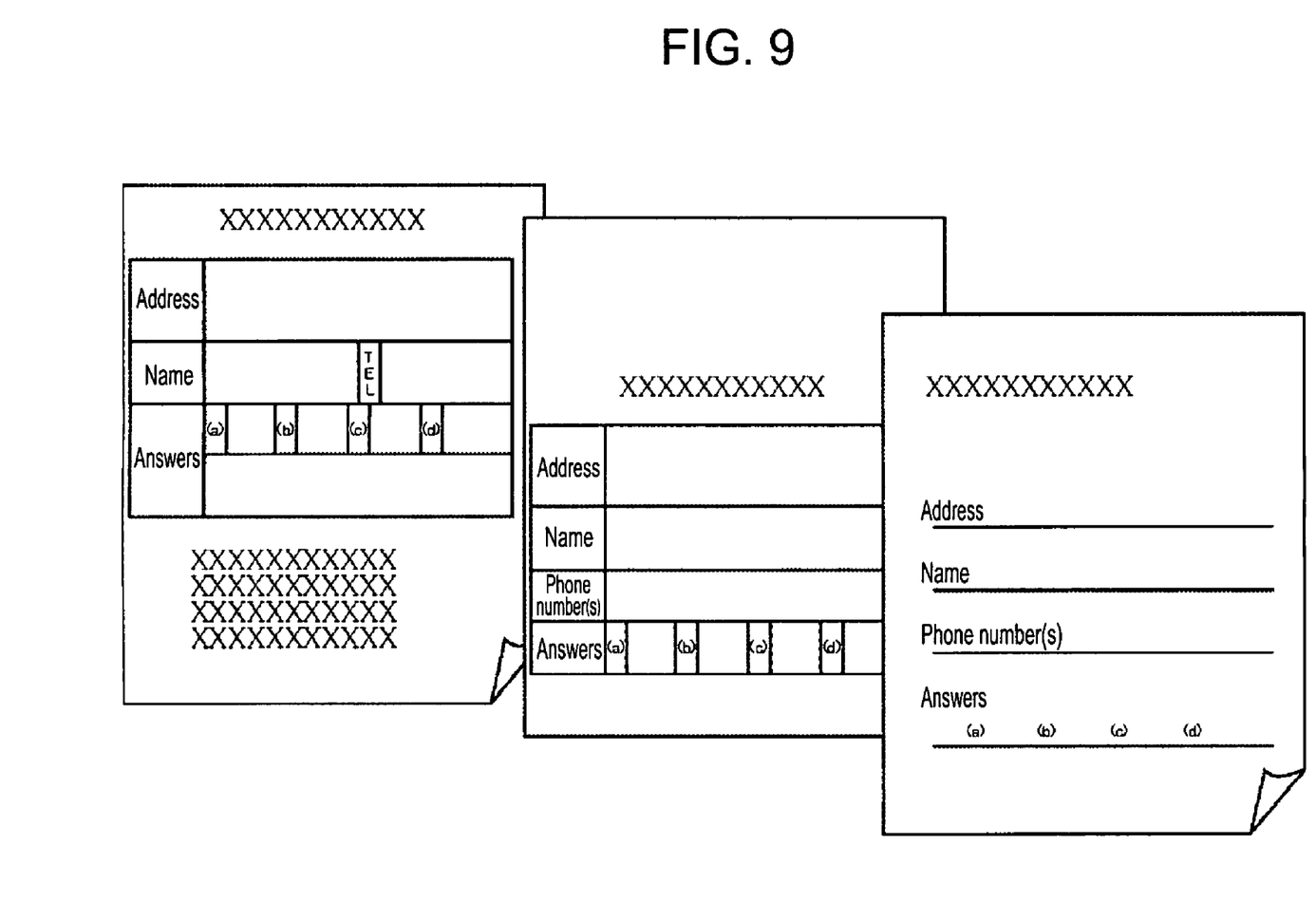
FIG. 9 illustrates various formats of document images.

Moreover, in a case where documents having different formats, as shown in FIG. 9, are read, region segmentation processing can be performed on each image of the documents, and the operator can quickly specify a desired recognition method on a desired item of each region.

Second Exemplary Embodiment

In the first exemplary embodiment, the region segmentation processor for analyzing an image obtained by scanning constitutes part of a software configuration embedded in the apparatus. However, as in the case of other recognition program modules, the region segmentation processor may constitute a region segmentation processing module that is downloaded from a program server when the processing is performed. In this case, the same advantageous effects as those in the first exemplary embodiment are achieved.

Third Exemplary Embodiment

In the first and second exemplary embodiments, before the choices of the recognition method are shown to the operator, a local program module for recognizing an item type of an image portion corresponding to an item region may be executed, so that the recognition method to be shown varies with the result of the execution. For example, on the basis of the result of the execution of a program for determining whether the type of the content of an item is a printed character, a handwritten character, or an imprint of a seal, the showing of the recognition method may be controlled in such a way that the recognition method by using a local program is shown for the printed character, the recognition method by using a program server is shown for the handwritten character, and the recognition method by using a recognition service server is shown for the imprint of the seal. In this case, the same advantageous effects as those in the exemplary embodiments described above are achieved, and since the shown recognition method is appropriate for the content of each item, the operator's selection can be facilitated.

In the exemplary embodiments described above, processing of correcting the result of region segmentation processing may be added. For example, when, in step S404, the image and the frames of the region segmentation result are being displayed, the region may be modified or a new region may be added by the operator. This feature makes it possible to perform the recognition processing on a region that was not correctly segmented.

As described in the first to third exemplary embodiments, when the operator is aiming to make the content of a paper document be recognized in the apparatus having the scanner through interactive operations, an image of the paper document is subjected to region segmentation processing immediately after the paper document is read, a recognition operation to be performed on each segmented region is specified by the operator on the basis of the result of the region segmentation processing. Therefore, a recognition method to be applied to each recognition target item can be selected from among recognition by using a recognition service server, recognition by downloading a program module from a program server, and recognition by using a locally-stored program module. As a result, recognition processing can be performed more efficiently.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-366014 filed Dec. 17, 2004, which is hereby incorporated by reference herein in its entirety.

What is claimed is:

1. An image processing apparatus comprising:
   a scanner that inputs document image data obtained by scanning a document; and
   a processing unit comprising:
      a region segmentation unit that extracts a plurality of recognition target regions from the document image data input by the scanner;
      a first selecting unit that allows an operator to select, from the plurality of recognition target regions extracted by the region segmentation unit, recognition target regions to be recognized;
      a second selecting unit that allows an operator to select a recognition process to be executed for individual recognition target regions selected by the first selecting unit; and
      a determining unit that, based on each recognition process selected in the second selecting unit, determines, for each of the selected recognition target regions, whether each of the selected recognition target regions is to be transmitted to an external recognizing device and to be subjected to recognition processing in the external recognizing device,
   wherein the second selecting unit provides the operator with, as choices for the recognition process, a first choice of transmitting a recognition target region to an external recognizing device for subjecting the transmitted recognition target region to the recognition processing in the external recognizing device, a second choice of downloading a program from an external device and performing the recognition processing of a recognition target region by using the downloaded program, and a third choice of performing the recognition processing by using a recognition program stored in the image processing apparatus.

2. The image processing apparatus according to claim 1, wherein the determining unit determines that, with respect to a recognition target region for which the first choice is selected in the second selecting unit, the recognition target region is to be transmitted to the external recognizing device and to be subjected to the recognition processing in the external recognizing device.

3. The image processing apparatus according to claim 1, wherein the determining unit determines that, with respect to a recognition target region for which the second choice is selected in the second selecting unit, the program is to be downloaded from the external device and the recognition target region is to be subjected to the recognition processing by using the downloaded program in the image processing apparatus.

4. The image processing apparatus according to claim 3, wherein the determining unit determines that, with respect to the recognition target region for which the second choice is selected in the second selecting unit, in a case where the program has been downloaded, the recognition target region is to be subjected to the recognition process in the image processing apparatus by using the program that has been downloaded.

5. The image processing apparatus according to claim 1, wherein the determining unit determines that, with respect to a recognition target region for which the third choice is selected in the second selecting unit, a module of the recognition program stored in the image processing apparatus is to be loaded and the recognition target region is to be subjected to the recognition processing in the image processing apparatus.

6. The image processing apparatus according to claim 1, wherein the second selecting unit determines a type of each of the recognition target regions extracted by the region segmentation unit, determines a plurality of selectable recognition processes in accordance with the type of each of the recognition target regions, and allows the operator to select a recognition process from the determined selectable recognition processes.

7. The image processing apparatus according to claim 1, further comprising a storing unit that stores a recognition result, the recognition result being obtained from execution of the recognition process selected in the second selecting unit with respect to each of the recognition target regions, in such a way that the recognition result is associated with the respective recognition target regions.

8. The image processing apparatus according to claim 1, further comprising a creating unit that creates an output document based on a recognition result obtained from execution of the recognition process selected in the second selecting unit with respect to each of the recognition target regions.

9. The image processing apparatus according to claim 1, wherein the first selecting unit displays the plurality of recognition target regions extracted by the region segmentation unit on a display in a recognizable manner and allows the operator to select, from the plurality of recognition target regions displayed on the display, the recognition target regions to be recognized.

10. An image processing apparatus comprising:
    a scanner that inputs document image data obtained by scanning a document; and
    a processing unit comprising:

a region segmentation unit that extracts a plurality of recognition target regions from the document image data input by the scanner;

a first selecting unit that displays the plurality of recognition target regions extracted by the region segmentation unit on a display in a recognizable manner and allows an operator to select, from the plurality of recognition target regions displayed on the display, recognition target regions to be recognized;

a second selecting unit that allows an operator to select a recognition process to be executed for individual recognition target regions selected by the first selecting unit; and a controlling unit that, in a case where the selection in the second selecting unit is that a recognition target region is to be transmitted to an external recognizing device and to be subjected to the recognition processing in the external recognizing device, transmits the recognition target region to the external recognizing device and subjects the recognition target region to the recognition processing in the external recognizing device, in a case where the selection in the second selecting unit is that a recognition program is to be downloaded from an external device and the recognition target region is to be subjected to the recognition processing, downloads the recognition program from the external device and subjects the recognition target region to the recognition processing, and in a case where the selection in the second selecting unit is that the recognition target region is to be subjected to the recognition processing by using a recognition program stored in advance, subjects the recognition target region to the recognition processing by using the recognition program stored in advance.

11. An image processing method performed by an image processing apparatus including a processing unit, the image processing method comprising:

an image input step, performed by a scanner, of inputting document image data obtained by scanning a document;

a region segmentation step, performed by a region segmentation unit controlled by the processing unit, of extracting a plurality of recognition target regions from the document image data input by the image input step;

a first selecting step, performed by a first selecting unit controlled by the processing unit; of allowing an operator to select, from the plurality of recognition target regions extracted by the region segmentation step, recognition target regions to be recognized;

a second selecting step, performed by a second selecting unit controlled by the processing unit, of allowing an operator to select a recognition process to be executed for individual recognition target regions selected in the first selecting step; and a determining step, performed by a determining unit controlled by the processing unit, of, based on each recognition process selected in the second selecting step, determining for each of the selected recognition target regions whether each of the selected recognition target regions is to be transmitted to an external recognizing device and to be subjected to recognition processing in the external recognizing device, wherein, in the second selecting step, the operator is provided with, as choices for the recognition process, a first choice of transmitting a recognition target region to an external recognizing device for subjecting the transmitted recognition target region to the recognition processing in the external recognizing device, a second choice of downloading a program from an external device and performing the recognition processing of a recognition target region by using the downloaded program, and a third choice of performing the recognition processing by using a recognition program stored in the image processing apparatus.

12. An image processing method performed by an image processing apparatus including a processing unit, the image processing method comprising:

an image input step, performed by a scanner, of inputting document image data obtained by scanning a document;

a region segmentation step, performed by a region segmentation unit controlled by the processing unit, of extracting a plurality of recognition target regions from the document image data input by the image input step;

a first selecting step, performed by a first selecting unit controlled by the processing unit, of displaying the plurality of recognition target regions extracted by the region segmentation step on a display in a recognizable manner and allowing an operator to select, from the plurality of recognition target regions displayed on the display, recognition target regions to be recognized;

a second selecting step, performed by a second selecting unit controlled by the processing unit, for allowing an operator to select a recognition process to be executed for individual recognition target regions selected in the first selecting step; and a controlling step of, in a case where the selection in the second selecting step is that a recognition target region is to be transmitted to an external recognizing device and to be subjected to the recognition processing in the external recognizing device, transmitting the recognition target region to the external recognizing device and subjecting the recognition target region to the recognition processing in the external recognizing device, in a case where the selection in the second selecting step is that a recognition program is to be downloaded from an external device and the recognition target region is to be subjected to the recognition processing, downloading the recognition program from the external device and subjecting the recognition target region to the recognition processing, and in a case where the selection in the second selecting step is that the recognition target region is to be subjected to the recognition processing by using a recognition program stored in advance, subjecting the recognition target region to the recognition processing by using the recognition program stored in advance.

13. A computer-readable storage medium storing a computer program for making a computer execute:

an image input step of inputting document image data obtained by scanning a document;

a region segmentation step of extracting a plurality of recognition target regions from the document image data input by the image input step;

a first selecting step of allowing an operator to select, from the plurality of recognition target regions extracted by the region segmentation step, recognition target regions to be recognized;

a second selecting step of allowing an operator to select a recognition process to be executed for individual recognition target regions selected in the first selecting step; and a determining step of, based on each recognition process selected in the second selecting step, determining for each of the selected recognition target regions whether each of the selected recognition target regions is to be transmitted to an external recognizing device and to be subjected to recognition processing in the external recognizing device, wherein, in the second selecting step, the operator is provided with, as choices for the recognition process, a first choice of transmitting a recognition target region to an external recognizing device for subjecting the transmitted recognition target region to the recognition processing in the external recognizing device, a second choice of downloading a program from an external device and performing the recognition processing of a recognition target region by using the downloaded program, and a third choice of performing the recognition processing by using a recognition program stored in the image processing apparatus.

14. A computer-readable storage medium storing a computer program for making a computer execute:

an image input step of inputting document image data obtained by scanning a document;

a region segmentation step of extracting a plurality of recognition target regions from the document image data input by the image input step;

a first selecting step of displaying the plurality of recognition target regions extracted by the region segmentation step on a display in a recognizable manner and of allowing an operator to select, from the plurality of recognition target regions displayed on the display, recognition target regions to be recognized;

a second selecting step, performed by a second selecting unit controlled by the processing unit, for allowing an operator to select a recognition process to be executed for individual recognition target regions selected in the first selecting step; and a controlling step of, in a case where the selection in the second selecting step is that a recognition target region is to be transmitted to an external recognizing device and to be subjected to the recognition processing in the external recognizing device, transmitting the recognition target region to the external recognizing device and subjecting the recognition target region to the recognition processing in the external recognizing device, in a case where the selection in the second selecting step is that a recognition program is to be downloaded from an external device and the recognition target region is to be subjected to the recognition processing, downloading the recognition program from the external device and subjecting the recognition target region to the recognition processing, and in a case where the selection in the second selecting step is that the recognition target region is to be subjected to the recognition processing by using a recognition program stored in advance, subjecting the recognition target region to the recognition processing by using the recognition program stored in advance.

15. An image processing apparatus comprising:

a scanner that inputs document image data obtained by scanning a document; and a processing unit comprising:

a region segmentation unit that extracts a plurality of recognition target regions from the document image data input by the scanner;

a first selecting unit that allows an operator to select, from the plurality of recognition target regions extracted by the region segmentation unit, recognition target regions to be recognized;

a second selecting unit that allows an operator to select a recognition process to be executed for individual recognition target regions selected by the first selecting unit; and a determining unit that, based on each recognition process selected in the second selecting unit, determines, for each of the selected recognition target regions, whether each of the selected recognition target regions is to be transmitted to an external recognizing device and to be subjected to recognition processing in the external recognizing device, wherein the second selecting unit provides, as choices for the recognition process, a first choice of transmitting a recognition target region to an external recognizing device for subjecting the transmitted recognition target region to the recognition processing in the external recognizing device, and a second choice of downloading a program from an external device and performing the recognition processing of a recognition target region by using the downloaded program.

16. An image processing apparatus comprising:

a scanner that inputs document image data obtained by scanning a document; and a processing unit comprising:

a region segmentation unit that extracts a plurality of recognition target regions from the document image data input by the scanner;

a first selecting unit that allows an operator to select, from the plurality of recognition target regions extracted by the region segmentation unit, recognition target regions to be recognized;

a second selecting unit that allows an operator to select a recognition process to be executed for individual recognition target regions selected by the first selecting unit; and a determining unit that, based on each recognition process selected in the second selecting unit, determines, for each of the selected recognition target regions, whether each of the selected recognition target regions is to be transmitted to an external recognizing device and to be subjected to recognition processing in the external recognizing device, wherein the second selecting unit provides, as choices for the recognition process, a second choice of downloading a program from an external device and performing the recognition processing of a recognition target region by using the downloaded program, and a third choice of performing the recognition processing by using a recognition program stored in the image processing apparatus.

* * * * *